US005689291A

United States Patent [19]

Tence et al.

[11] Patent Number: 5,689,291

[45] Date of Patent: Nov. 18, 1997

[54] METHOD AND APPARATUS FOR PRODUCING DOT SIZE MODULATED INK JET PRINTING

[75] Inventors: David A. Tence, Tigard; Sharon S. Berger, Salem; Ronald F. Burr, Wilsonville, all of Oreg.

[73] Assignee: Tektronix, Inc., Wilsonville, Oreg.

[21] Appl. No.: 371,197

[22] Filed: Jan. 11, 1995

Related U.S. Application Data

[63] Continuation-in-part of Ser. No. 100,504, Jul. 30, 1993, Pat. No. 5,495,270.

[51] Int. Cl.[6] .......... B41J 2/045; G01D 15/16

[52] U.S. Cl. .......... 347/10; 347/11; 347/68; 347/70

[58] Field of Search .......... 347/10, 15, 68, 347/70, 39, 11, 57, 14

[56] References Cited

U.S. PATENT DOCUMENTS

| | | | |
|---|---|---|---|
| 3,946,398 | 3/1976 | Kyser et al. | 347/70 |
| 4,393,384 | 7/1983 | Kyser | 347/94 |
| 4,503,444 | 3/1985 | Tacklind | 347/11 |
| 4,513,299 | 4/1985 | Lee et al. | 347/15 |
| 4,563,689 | 1/1986 | Murakami et al. | 347/11 |
| 4,639,735 | 1/1987 | Yamamoto et al. | 347/68 |
| 4,730,197 | 3/1988 | Raman et al. | 347/40 |
| 4,746,935 | 5/1988 | Allen | 347/98 |
| 5,124,716 | 6/1992 | Roy et al. | 347/11 |
| 5,170,177 | 12/1992 | Stanley et al. | 347/11 |

OTHER PUBLICATIONS

"Spot–Size Modulation in Drop–On–Demand Ink–Jet Technology," E. P. Hofer, Society for Information Display Digest, 1985, pp. 321, 322.

*Primary Examiner*—Benjamin R. Fuller

*Assistant Examiner*—L. Anderson

*Attorney, Agent, or Firm*—Ralph D'Alessandro; Richard B. Preiss

[57] ABSTRACT

An ink jet (10, 200) provides high-resolution gray scale printing or switchable resolution printing by providing PZT drive waveforms (100, 110, 120, 360, 370), each having a spectral energy distribution that excites a modal resonance of ink in an ink jet print head orifice (14, 208). By selecting the particular drive waveform with selectable energy inputs that concentrates spectral energy at frequencies associated with a desired oscillation mode and that suppresses energy at the other oscillation modes, an ink drop (170, 180, 190, 210) is ejected that has a diameter proportional to a center excursion size of the selected meniscus surface oscillation mode. The center excursion size of high order oscillation modes is substantially smaller than the orifice diameter, thereby causing ejection of ink drops smaller than the orifice diameter. Conventional orifice manufacturing techniques may be used because a specific orifice diameter is not required. Jetting reliability and contaminant susceptibility are, thereby, improved by eliminating the need for an unconventionally small orifice. Changing a selected PZT drive waveform amplitude changes drop ejection velocity without substantially changing drop volume. This invention, therefore, provides for selection of ejected ink drop volumes having substantially the same ejection velocity over a wide range of drop ejection repetition rates.

25 Claims, 14 Drawing Sheets

METHOD AND APPARATUS FOR PRODUCING DOT SIZE MODULATED INK JET PRINTING

RELATED APPLICATIONS

This application is a continuation-in-part of now U.S. Pat. No. 5,495,270 issued Feb. 27, 1996.

1. Technical Field

This invention relates to ink jet printing and more particularly to a method and an apparatus for ejecting ink drops of differing volumes from an ink jet print head.

2. Background of the Invention

Prior drop-on-demand ink jet print heads typically eject ink drops of a single volume that produce on a print medium dots of ink sized to provide "solid fill" printing at a given resolution, such as 12 dots per millimeter. Single dot size printing is acceptable for most text and graphics printing applications not requiring "photographic" image quality. Photographic image quality normally requires a combination of high dot resolution and an ability to modulate a reflectance (i.e., gray scale) of dots forming the image.

In single dot size printing, average reflectance of a region of an image is typically modulated by a process referred to as "dithering" in which the perceived intensity of an array of dots is modulated by selectively printing the array at a predetermined dot density. For example, if a 50 percent local average reflectance is desired, half of the dots in the array are printed. A "checker board" pattern provides the most uniform appearing 50 percent local average reflectance. Multiple dither pattern dot densities are possible to provide a wide range of reflectance levels. For a two-by-two dot array, four reflectance level patterns are possible. An eight-by-eight dot array can produce 256 reflectance levels. A usable gray scale image is achieved by distributing a myriad of appropriately dithered arrays across a print medium in a predetermined arrangement.

However, with dithering, there is a trade-off between the number of possible reflectance levels and the dot array area required to achieve those levels. Eight-by-eight dot army dithering in a printer having 12 dot per millimeter (300 dots per inch) resolution results in an effective gray scale resolution as low as 1.5 dots per millimeter (75 dots per inch). Gray scale images printed with such dither array patterns, however, suffer from image quality degradation.

An alternative to dithering is ink dot size modulation that entails controlling the volume of each drop of ink ejected by the ink jet head. Ink dot size modulation (hereafter referred to as "gray scale printing") maintains full printer resolution by eliminating the need for dithering. Moreover, gray scale printing provides greater effective printing resolution. For example, an image printed with two dot sizes at 12 dots per millimeter (300 dots per inch) resolution may have a better appearance than the same image printed with one dot size at 24 dots per millimeter (600 dots per inch) resolution with a two-dot dither array.

There are previously known apparatus and methods for modulating the volume of ink drops ejected from an ink jet print head. U.S. Pat. No. 3,946,398, issued Mar. 23, 1976 for a METHOD AND APPARATUS FOR RECORDING WITH WRITING FLUIDS AND DROP PROJECTION MEANS THEREFORE describes a variable drop volume drop-on-demand ink jet head that ejects ink drops in response to pressure pulses developed in an ink pressure chamber by a piezoceramic transducer (hereafter referred to as a "PZT"). Drop volume modulation entails varying an amount of electrical waveform energy applied to the PZT for the generation of each pressure pulse. However, it is noted that varying the drop volume also varies the drop ejection velocity which causes in drop landing position errors. Constant drop volume, therefore, is taught as a way of maintaining image quality. Moreover, the drop ejection rate is limited to about 3,000 drops per second, a rate that is slow compared to typical printing speed requirements.

U.S. Pat. No. 4,393,384, issued Jul. 12, 1983 for an INK PRINTHEAD DROPLET EJECTING TECHNIQUE describes an improved PZT drive waveform that produces pressure pulses which are timed to interact with an ink meniscus positioned in an ink jet orifice to modulate ink drop volume. The drive waveform is shaped to avoid ink meniscus and print head resonances, and to prevent excessive negative pressure excursions, thereby achieving a higher drop ejection rate, a faster drop ejection velocity, and improved drop landing position accuracy. The technique provides independent control of drop volume and ejection velocity.

However, this droplet ejection technique only provides ink drops having a diameter equal to, or larger than, the orifice diameter. An orifice diameter ink drop flattens upon impacting a print medium, producing a dot larger than the orifice diameter. Solid fill printing entails ejecting a continuous stream of the largest volume ink drops tangentially spaced apart at the resolution of the printer. Therefore, in a 12 dot per millimeter resolution printer, the largest dots must be about 118 microns in diameter. If gray scale printing is required, smaller dots are required that are limited to a diameter somewhat larger than the orifice diameter. Clearly, an orifice diameter approaching 25 microns is required, but this is a diameter that is impractical to manufacture and which clogs easily.

U.S. Pat. No. 5,124,716, issued Jun. 23, 1992 for a METHOD AND APPARATUS FOR PRINTING WITH INK DROPS OF VARYING SIZES USING A DROP-ON-DEMAND INK JET PRINT HEAD, assigned to the assignee of the present invention, and U.S. Pat. No. 4,639,735, issued Jan. 27, 1987 for APPARATUS FOR DRIVING LIQUID JET HEAD describe circuits and PZT drive waveforms suitable for ejecting ink drops smaller than an ink jet orifice diameter. However, each ink drop has an ejection velocity proportional to its volume which, unfortunately, can cause drop landing position errors.

Ink drop ejection velocity compensation is described in copending U.S. patent application Ser. No. 07/892,494 of Roy et al., filed Jun. 3, 1992 for METHOD AND APPARATUS FOR PRINTING WITH A DROP-ON-DEMAND INK-JET PRINT HEAD USING AN ELECTRIC FIELD and assigned to the assignee of the present invention. A time invariant electric field accelerates the ink drops in inverse proportion to their volumes, thereby reducing the effect of ejection velocity differences. In another aspect of electric field operation, a PZT is driven with a waveform sufficient to cause an ink meniscus to bulge from the orifice, but insufficient to cause drop ejection. The electric field attracts a fine filament of ink from the bulging meniscus to form an ink drop smaller than the orifice diameter. Unfortunately, the electric field adds complexity, cost, potential danger, dust attraction, and unreliability to a printer.

And yet another approach to modulating drop volume is disclosed in U.S. Pat. No. 4,746,935, issued May 24, 1988 for a MULTITONE INK JET PRINTER AND METHOD OF OPERATION. This describes an ink jet print head having multiple orifice sizes, each optimized to eject a particular drop volume. Of course, such a printhead is significantly more complex than a single orifice size print head having at least two times the number of jets, and still requires a very small orifice to produce the smallest drop volume.

U.S. Pat. No. 4,503,444, issued Mar. 5, 1985 for a METHOD AND APPARATUS FOR GENERATING A GRAY SCALE WITH A HIGH SPEED THERMAL INK JET PRINTER, U.S. Pat. No. 4,513,299, issued Apr. 23, 1985 for SPOT SIZE MODULATION USING MULTIPLE PULSE RESONANCE DROP EJECTION, and "Spot-Size Modulation in Drop-On-Demand Ink-Jet Technology," E. P. Hofer, SID Digest, 1985, pp. 321, 322, each describe using a multi-pulse PZT drive waveform to eject a predetermined number of small ink drops that merge during flight to form a single larger ink drop. This technique has the advantage of constant drop ejection velocity, but inherently forms drops much larger than the ink jet head orifice diameter.

Clearly, the physical laws governing ink jet drop formation and ejection are complexly interactive. Therefore, U.S. Pat. No. 4,730,197, issued Mar. 8, 1988 for an IMPULSE INK JET SYSTEM describes and characterizes numerous interactions among ink jet geometric features, PZT drive waveforms, meniscus resonance, pressure chamber resonance, and ink drop ejection characteristics. In particular, in a multiple-orifice print head, cross-talk among the jets affects ink drop volume uniformity, so "dummy channels" and compliant chamber walls are provided to minimize the effects of cross-talk. Drop ejection rates of 10 kiloHertz are achieved with PZT drive waveform compensation techniques that account for print head and fluidic resonances. However, this reference strives to achieve uniform drop volume so that the resulting drop diameter is about the same as the orifice diameter. There is no recognition of ink drop volume modulation in the patent, and the patent is not addressed to gray scale printing.

U.S. Pat. No. 5,170,177, issued Dec. 8, 1992 for a METHOD OF OPERATING AN INK JET TO ACHIEVE HIGH PRINT QUALITY AND HIGH PRINT RATE, assigned to the assignee of the present invention, describes PZT drive waveforms having a spectral energy distribution that is minimized at dominant ink jet head resonant frequencies. A constant ink drop volume and ejection velocity are thereby achieved over a wide range of drop repetition rates. However, similar to the teaching of U.S. Pat. No. 4,730,197, uniform and optimum ink drop volume is sought, and the resulting drop diameter is about the same as the orifice diameter. Again, there is no recognition of ink drop volume modulation nor is attention given to gray scale printing.

What is needed, therefore, is a simple and inexpensive ink jet print head system that provides high-resolution gray scale printing and selectable resolution printing without sacrificing performance. This need is met by the design and method of the present invention.

SUMMARY OF THE INVENTION

An object of this invention is, therefore, to provide a gray scale ink jet printing method for producing at a high repetition rate ink drops that have a controllable size that can be smaller than the orifice size.

Another object of this invention is to provide a method of driving a conventional ink jet head to improve its performance and the resolution of the output product.

A further object of this invention is to provide an apparatus and a method for obtaining small ink jet orifice performance from a reliable and simple to manufacture large ink jet orifice.

Still another object of this invention is to provide a high-resolution gray scale ink jet printing apparatus and method that does not require dithering, electric fields, or multiple jet and/or orifice sizes.

Yet another object of this invention is to provide a high-resolution ink jet printing apparatus and method that provides multiple selectable printing resolutions.

An ink jet apparatus and method according to this invention provides high-resolution gray scale printing or selectable resolution printing by providing multiple PZT drive waveforms, each having a spectral energy distribution that excites a different modal resonance of ink in an ink jet print head orifice. By selecting the particular drive waveform that concentrates spectral energy at frequencies associated with a desired oscillation mode and that avoids extraneous or parasitic frequencies that compete with the desired mode to suppress energy at other oscillation modes, an ink drop is ejected that has a diameter proportional to a center excursion size of the selected meniscus surface oscillation mode. The center excursion size of high order oscillation modes is substantially smaller than the orifice diameter, thereby causing ejection of ink drops smaller than the orifice diameter. Conventional orifice manufacturing techniques may be used because a specific orifice diameter is not required.

It is an advantage that jetting reliability is improved by eliminating the need for an unconventionally small orifice, as well as reducing the potential for contaminants plugging the ink jet orifice.

It is another advantage that the invention provides for selection of ejected ink drop volumes that may have substantially the same ejection velocity over a wide range of ejection repetition rates.

It is a further advantage that the invention provides selection of multiple printing resolutions that allow trading off printing speed for printing quality.

Additional objects and advantages of this invention will be apparent from the following detailed description of preferred embodiments thereof that proceeds with reference to the accompanying drawings.

DETAILED DESCRIPTION OF PREFERRED EMBODIMENTS

Figure 1:
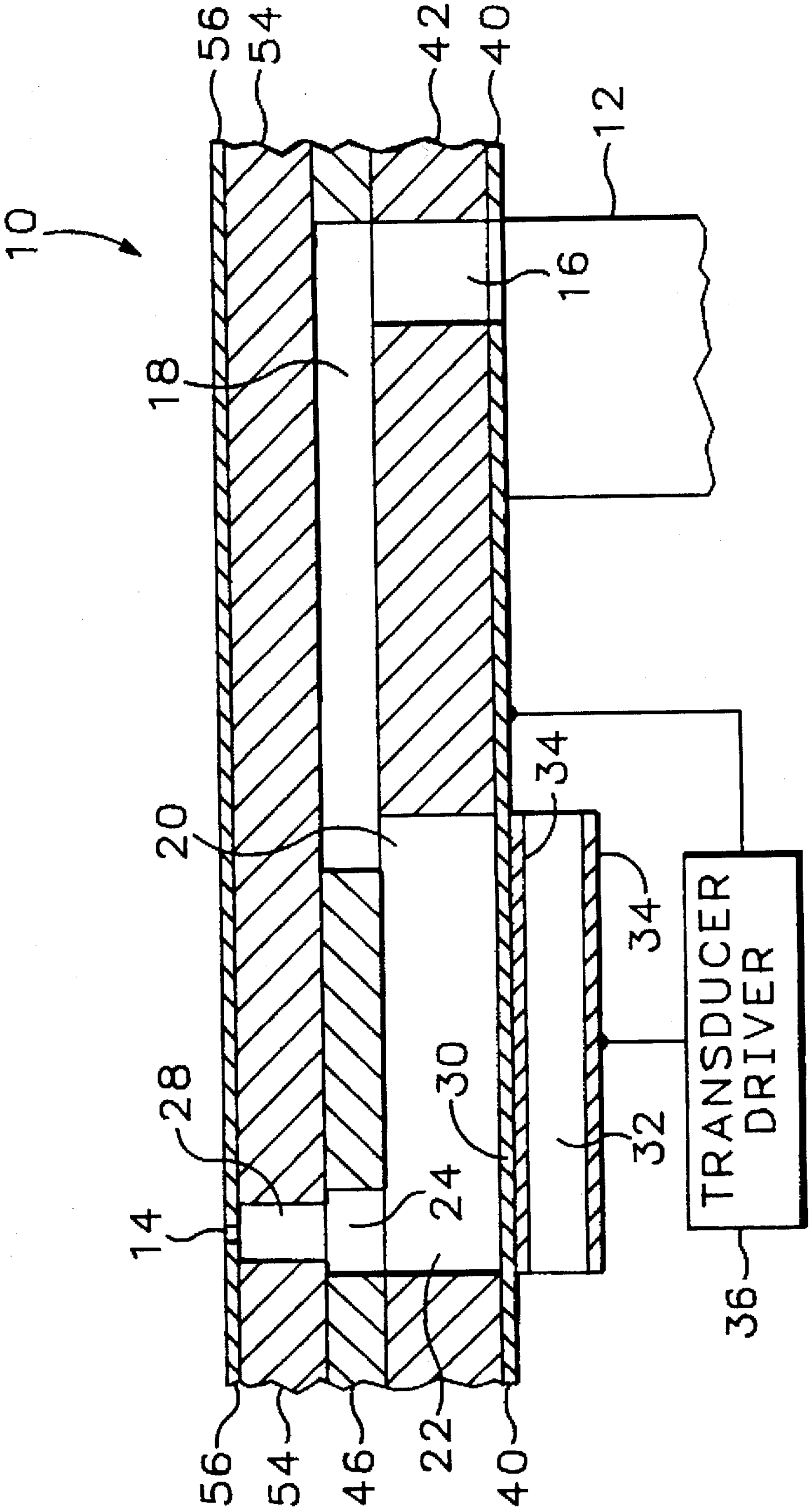
FIG. 1 is a diagrammatical cross-sectional view of a PZT driven ink jet suitable for use in an ink jet print head of a type used with this invention.

FIG. 1 shows a cross-sectional view of an ink jet 10 that is part of an ink jet print head suitable for use with this invention. Ink jet 10 has a body that defines an ink manifold 12 through which ink is delivered to the ink jet print head. The body also defines an ink drop forming orifice 14 together with an ink flow path from ink manifold 12 to orifice 14. In general, the ink jet print head preferably includes an array of orifices 14 that are closely spaced from one another for use in printing drops of ink onto an image receiving medium (not shown).

A typical ink jet print head has at least four manifolds for receiving, black, cyan, magenta, and yellow ink for use in black plus subtractive three-color printing. However, the number of such manifolds may be varied depending upon whether a printer is designed to print solely in black ink or with less than a full range of color. Ink flows from manifold 12, through an inlet port 16, an inlet channel 18, a pressure chamber port 20, and into an ink pressure chamber 22. Ink leaves pressure chamber 22 by way of an outlet port 24, flows through an outlet channel 28 to nozzle 14, from which ink drops are ejected. Alternatively, an offset channel may be added between pressure chamber 22 and orifice 14 to suit particular ink jet applications.

Ink pressure chamber 22 is bounded on one side by a flexible diaphragm 30. An electromechanical transducer 32, such as a PZT, is secured to diaphragm 30 by an appropriate adhesive and overlays ink pressure chamber 22. In a conventional manner, transducer 32 has metal film layers 34 to which an electronic transducer driver 36 is electrically connected. Although other forms of transducers may be used, transducer 32 is operated in its bending mode such that when a voltage is applied across metal film layers 34, transducer 32 attempts to change its dimensions. However, because it is securely and rigidly attached to the diaphragm, transducer 32 bends, deforming diaphragm 30, and thereby displacing ink in ink pressure chamber 22, causing the outward flow of ink through outlet port 24 and outlet channel 28 to nozzle 14. Refill of ink pressure chamber 22 following the ejection of an ink drop is augmented by reverse bending of transducer 34 and the concomitant movement of diaphragm 30.

To facilitate manufacture of the ink jet print head usable with the present invention, ink jet 10 is preferably formed of multiple laminated plates or sheets, such as of stainless steel. These sheets are stacked in a superimposed relationship. In the illustrated FIG. 1 embodiment of the present invention, these sheets or plates include a diaphragm plate 40, that forms diaphragm 30 and a portion of manifold 12; an ink pressure chamber plate 42, that defines ink pressure chamber 22 and a portion of manifold 12; an inlet channel plate 46, that defines inlet channel 18 and outlet port 24; an outlet plate 54, that defines outlet channel 28; and an orifice plate 56, that defines orifice 14 of ink jet 10.

More or fewer plates than those illustrated may be used to define the various ink flow passageways, manifolds, and pressure chambers of the ink jet print head. For example, multiple plates may be used to define an ink pressure chamber instead of the single plate illustrated in FIG. 1. Also, not all of the various features need be in separate sheets or layers of metal. For example, patterns in the photoresist that are used as templates for chemically etching the metal (if chemical etching is used in manufacturing) could be different on each side of a metal sheet. Thus, as a more specific example, the pattern for the ink inlet passage could be placed on one side of the metal sheet while the pattern for the pressure chamber could be placed on the other side and in registration front-to-back. Thus, with carefully controlled etching, separate ink inlet passage and pressure chamber containing layers could be combined into one common layer.

To minimize fabrication costs, all of the metal layers of the ink jet print head, except orifice plate 56, are designed so that they may be fabricated using relatively inexpensive conventional photo-patterning and etching processes in metal sheet stock. Machining or other metal working processes are not required. Orifice plate 56 has been made successfully using any number of processes, including electroforming with a sulfumate nickel bath, micro-electric discharge machining in three hundred series stainless steel, and punching three hundred series stainless steel, the last two approaches being used in concert with photo-patterning and etching all of the features of orifice plate 56 except the orifices themselves. Another suitable approach is to punch the orifices and use a standard blanking process to form any remaining features in the plate.

Table 1 shows acceptable dimensions for the ink jet of FIG. 1. The actual dimensions employed are a function of the ink jet and its packaging for a specific application. For example, the orifice diameter of the orifice 14 in orifice plate 56 can vary from about 25 to about 150 microns.

TABLE 1

| All dimensions in millimeters | | | | |
|---|---|---|---|---|
| Feature | Length | Width | Height | Cross Section |
| Inlet channel | 6.4 | .30 | 2.0 | Rectangular |
| Pressure chamber | .2 | 2.20 | 2.20 | Circular |
| Outlet port | 1.0 | .41 | .41 | Circular |
| Outlet channel | .2 | .25 | .25 | Circular |
| Orifice | .08 | .08 | .08 | Circular |

The electromechanical transducer mechanism selected for the ink jet print heads of the present invention can comprise ceramic disc transducers bonded with epoxy to the diaphragm plate 40, with the disc centered over ink pressure chamber 22. For this type of transducer mechanism, a substantially circular shape has the highest electromechanical efficiency, which refers to the volume displacement for a given area of the piezoceramic element.

Ejecting ink drops having controllable volumes from an ink jet such as that of FIG. 1 entails providing from transducer driver 36, multiple selectable drive waveforms to transducer 32. Transducer 32 responds to the selected waveform by inducing pressure waves in the ink that excite ink fluid flow resonances in orifice 14 and at the ink surface meniscus. A different resonance mode is excited by each selected waveform and a different drop volume is ejected in response to each resonance mode.

Figure 2A:
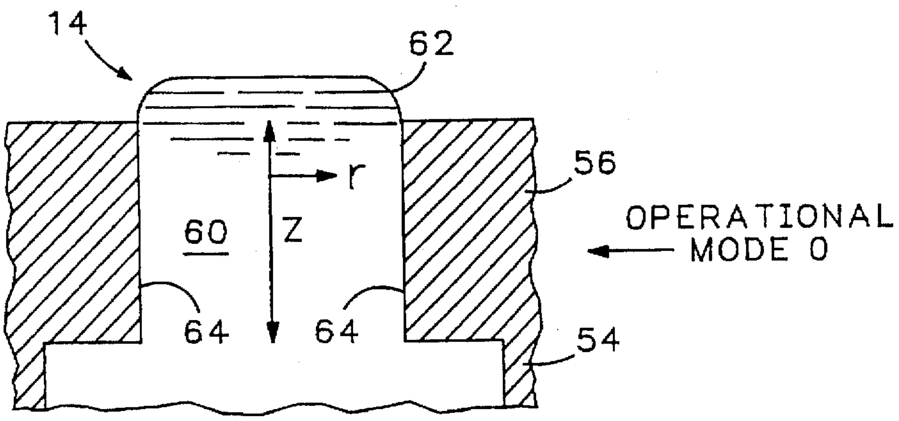
FIGS. 2A, 2B, and 2C are enlarged pictorial cross-sectional views of an orifice portion of the ink jets of FIG. 1 showing representative orifice fluid flow operational modes zero, one, and two according to this invention.
Figure 2B:
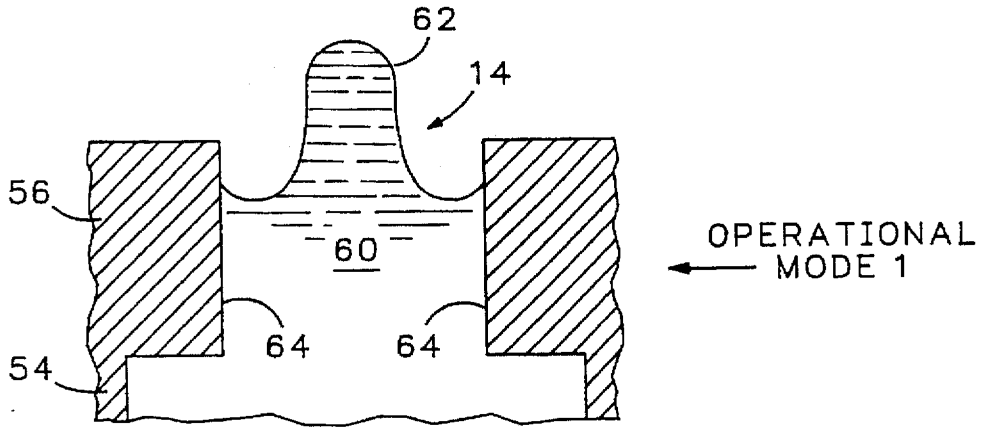
Figure 2C:
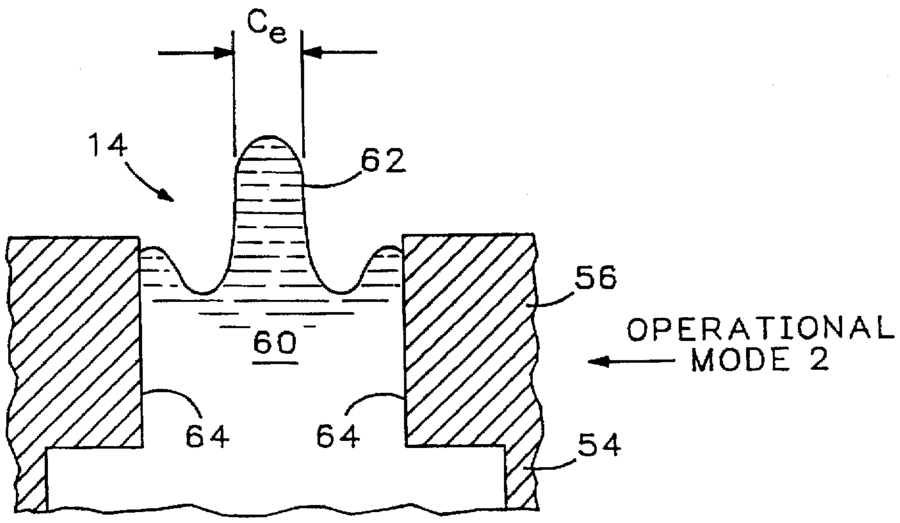

Referring to FIGS. 2A, 2B, and 2C, an ink column 60 having a meniscus 62 is shown positioned in orifice 14. Meniscus 62 is shown excited in three operational modes, referred to respectively as modes zero, one, and two in FIGS. 2A, 2B, and 2C. FIG. 2C shows a center excursion $C_c$ of the meniscus surface of a high order oscillation mode. In the following theoretical description, orifice 14 is assumed to be cylindrical, although the inventive principles apply equally to non-cylindrical orifice shapes.

The particular mode excited in orifice 14 is governed by a combination of the internal orifice flow and meniscus surface dynamics. Because orifice 14 is cylindrical, the internal and meniscus surface dynamics act together to cause meniscus 62 to oscillate in modes described by Bessel function type solutions of the governing fluid dynamic equations.

FIG. 2A shows operational mode zero which corresponds to a bulk forward displacement of ink column 60 within a wall 64 of orifice 14. Prior workers have based ink jet and drive waveform design on mode zero operation. Ink surface tension and viscous boundary layer effects associated with wall 64 cause meniscus 62 to have a characteristic rounded shape indicating the lack of higher order modes. The natural resonant frequency of mode zero is primarily determined by the bulk motion of the ink mass interacting with the compression of the ink inside the ink jet (i.e., like a Helmholtz oscillator). The geometric dimensions of the various fluidically coupled ink jet components, such as channels 18 and 28, manifold 12, ports 16, 20, 22, and 24, and pressure chamber 22, all of FIG. 1, are sized to avoid extraneous or parasitic resonant frequencies that would interact with the orifice resonance modes.

Designing drive waveforms suitable for drop volume modulation, therefore, requires a further knowledge of the natural frequencies of the orifice and meniscus system elements so that a waveform can be designed that concentrates energy at frequencies near the natural frequency of a desired mode and suppresses energy at the natural frequencies of other mode(s) and extraneous or parasitic resonant frequencies which compete with the desired mode for energy. These extraneous or parasitic resonant frequencies adversely affect the ejection of ink droplets from the ink jet orifice in several ways, including, but not limited to, ink drop size and the drop ejection velocity, which effects the time it takes the ejected drop to reach the image receiving medium, thereby also affecting the accuracy of drop placement on the media.

The ink meniscus surface dynamics are modeled by a fluid pressure flow analysis in a representative orifice. Shown below are the equations governing the fluid dynamics and boundary conditions. Governing Equation:

$$\frac{1\phi}{r\partial r}\left(r\frac{\partial\phi}{\partial r}\right)+\frac{\partial^2\phi}{\partial z^2}=0$$

Centerline boundary condition:

$$v|_{r=0}=\frac{\partial\phi}{\partial r}|_{r=0}=0$$

Outside wall boundary condition:

$$v|_{r=R}=\frac{\partial\phi}{\partial r}|_{r=R}=0$$

Bottom boundary condition:

$$\phi|_{z=0}=0$$

Free surface boundary condition:

$$\left(\frac{\partial^2\phi}{\partial t^2}+\frac{\sigma}{\rho}\left(\frac{1}{r}\frac{\partial}{\partial r}\left(r\frac{\partial}{\partial r}\frac{\partial\phi}{\partial z}\right)\right)\right)_{z=h}=0$$

A solution is obtained by taking a Laplace transform in time and separating the variables in two space dimensions z and r, where z is an axial distance and r is a radial distance within orifice 14. The solution in the radial direction is a Bessel function of the first kind:

$$\Phi=(B_1 \sin h(k_n z)+B_2 \cos h(k_n z))J_0(k_n r)$$

Matching the boundary conditions determines the allowable modal oscillation frequencies:

$$\omega^2=\left(\frac{w}{t}\right)^2=\frac{\sigma k_n^3\coth(k_n h)}{\rho R^3}$$

$$\omega_1(h)=\frac{\sqrt{\sigma(k_1)^3\frac{\coth(k_1 h)}{\rho R^3}}}{2\pi}$$

$$\omega_2(h)=\frac{\sqrt{\sigma(k_2)^3\frac{\coth(k_2 h)}{\rho R^3}}}{2\pi}$$

$$\omega_3(h)=\frac{\sqrt{\sigma(k_3)^3\frac{\coth(k_3 h)}{\rho R^3}}}{2\pi}$$

Where: $k_1$=3.832, $k_4$=7.016, $k_3$=10.174, h=0.1 to 2.0 by steps of 0.2, σ=25, ρ=0.85, and R=0.0038 centimeters.

Figure 3:
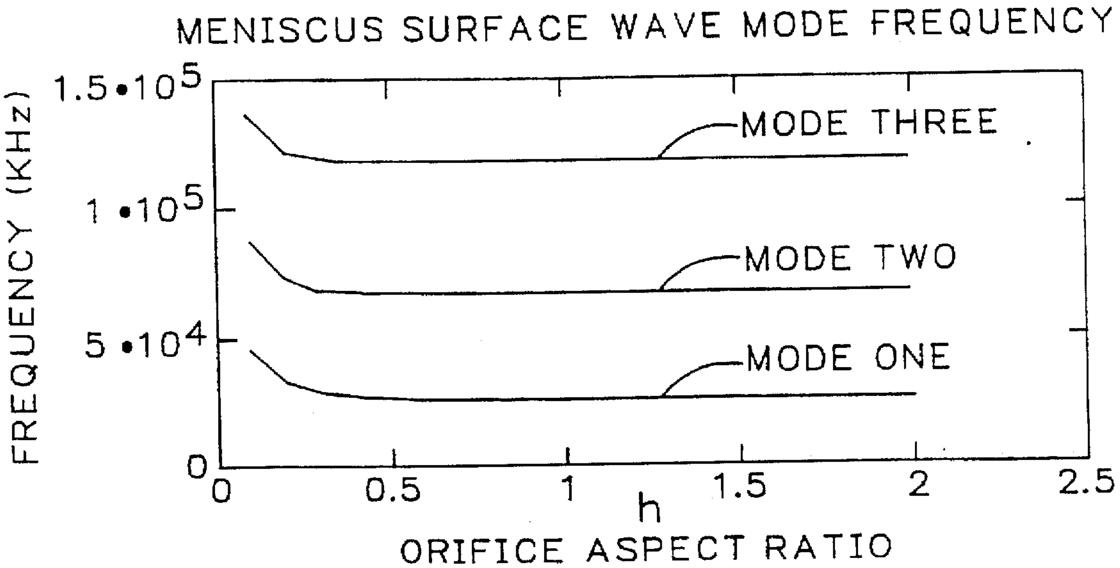
FIG. 3 graphically shows meniscus surface wave mode frequency as a function of orifice aspect ratio.

FIG. 3 graphically shows the calculated mode one, two, and three frequencies for a typical ink jet geometry as a function of orifice aspect ratio. For most orifice aspect ratios the frequencies for modes one, two, and three are respectively about 30, 65, and 120 kiloHertz. Mode three is not shown in FIG. 2.

Figure 4:
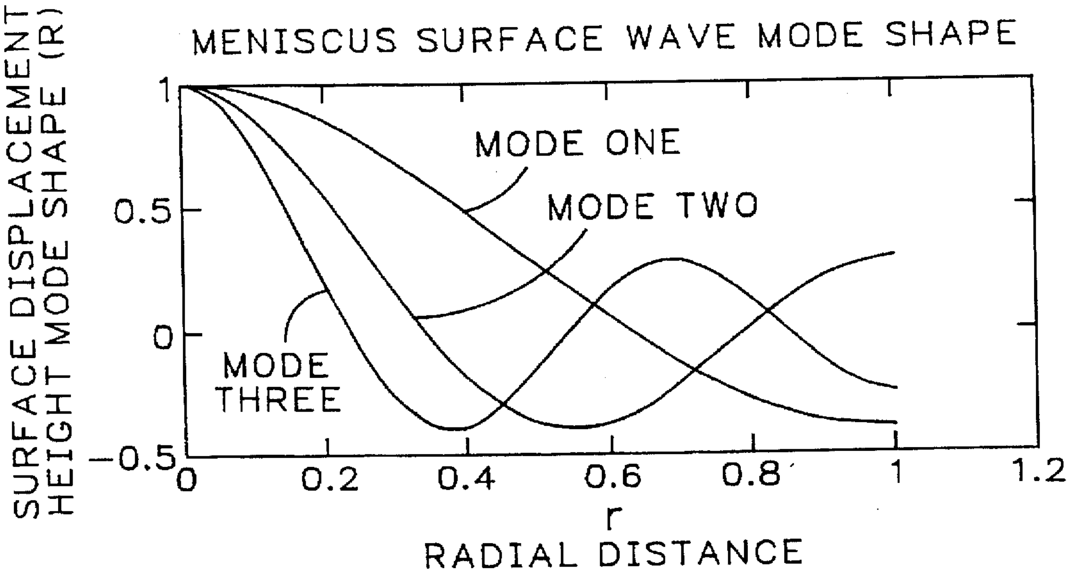
FIG. 4 graphically shows a mathematically modeled meniscus surface wave mode displacement height as a function of orifice radial distance and mode number.
Figure 5A:
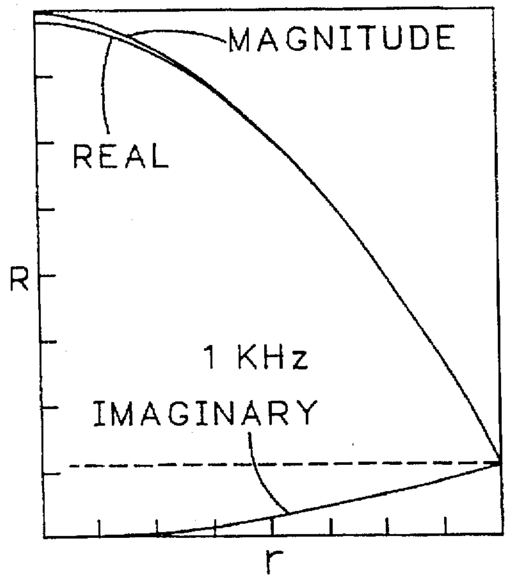
FIGS. 5A–5F graphically show the computed real and imaginary components of internal inertial and viscous orifice velocity mode shapes plotted for respective 1, 10, 20, 35, 50, and 100 kiloHertz excitation frequencies.
Figure 5B:
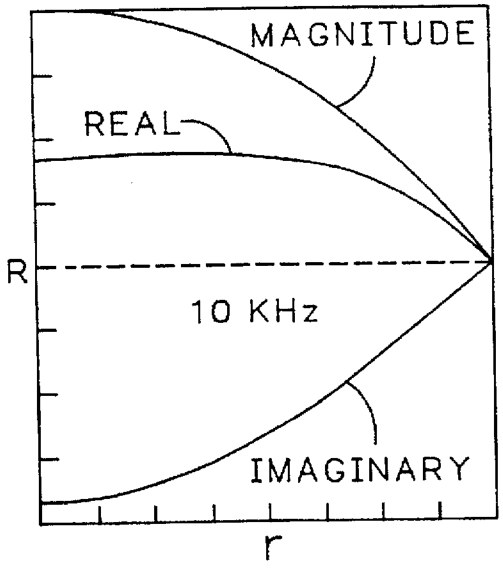
Figure 5C:
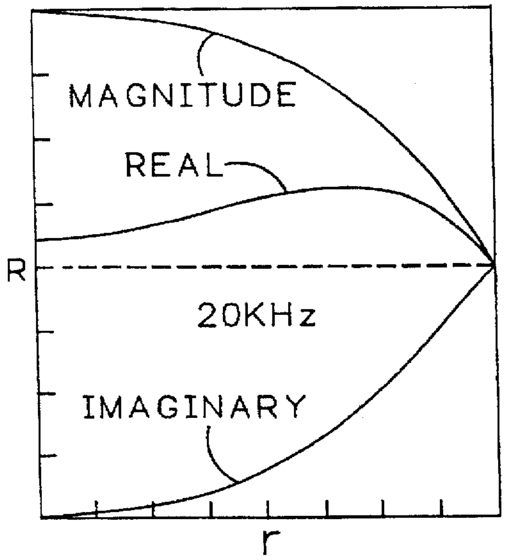
Figure 5D:
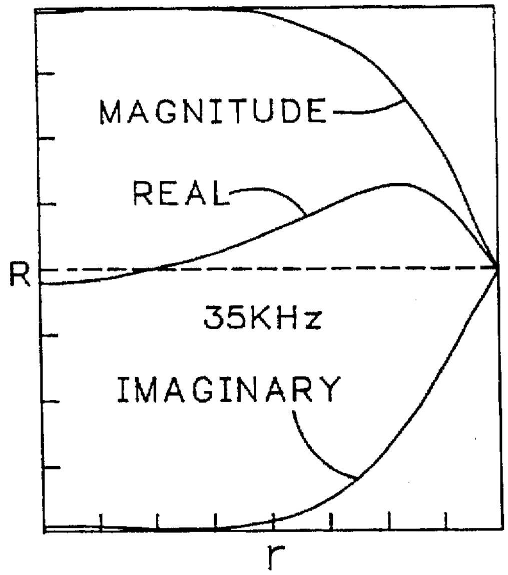
Figure 5E:
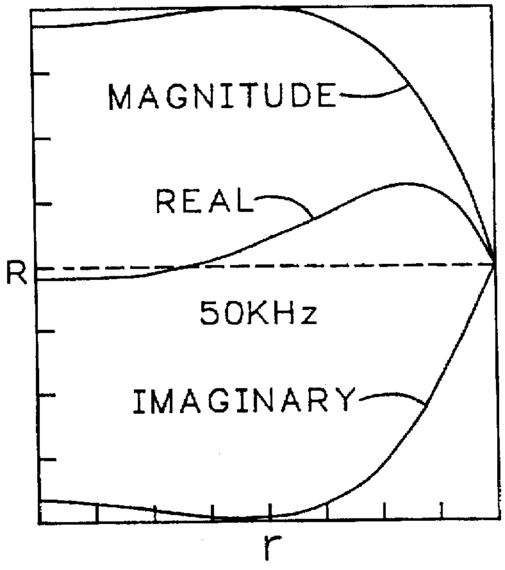
Figure 5F:
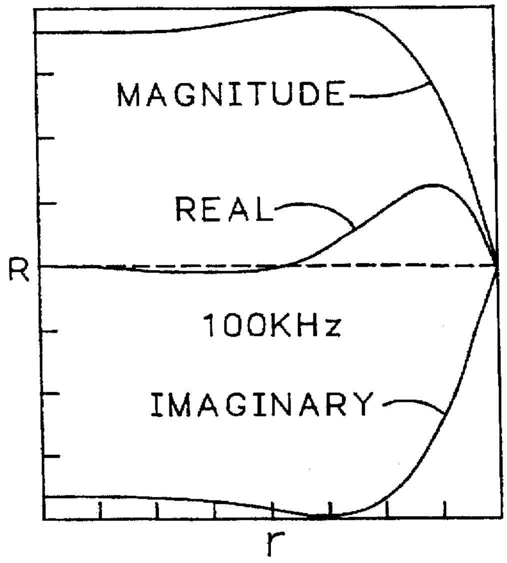

FIG. 4 graphically shows a calculated radial mode shape corresponding to modes one, two, and three shown in FIG. 3. Data were calculated using the equations; $R_1(r)=J_0(k_1r)$, $R_2(r)=J_0(k_2r)$, and $R_3(r)=J_0(k_3r)$, where $J_0$ is a Bessel function of the first kind and of the zeroth order.

The foregoing analysis illustrates the basic surface modes neglecting viscous behavior effects in the orifice. When viscous orifice flow is considered, a simplified governing equation for mode shape is:

$$\frac{\partial u}{\partial t}-\frac{\nu}{r}\frac{\partial}{\partial r}\left(r\frac{\partial u}{\partial r}\right)=-\frac{1}{\rho}\frac{\partial p}{\partial x}$$

Assuming a periodic driving pressure wave with a frequency $\omega=2\pi f$, the radial mode shape R is determined by calculating the following complex Bessel differential equation:

$$j\omega R-\frac{\nu}{r}\frac{\partial}{\partial r}\left(r\frac{\partial R}{\partial r}\right)=1$$

FIGS. 5A–5F graphically show the resulting real and imaginary components of the mode shape at various frequencies. The following are several phenomena which are noteworthy: 1) Phase shift of the primary response between 1 and 20 kiloHertz, 2) overshoot in the real response above 20 kiloHertz, and 3) center modes in both the real and imaginary responses above 35 kiloHertz.

Figure 6A:
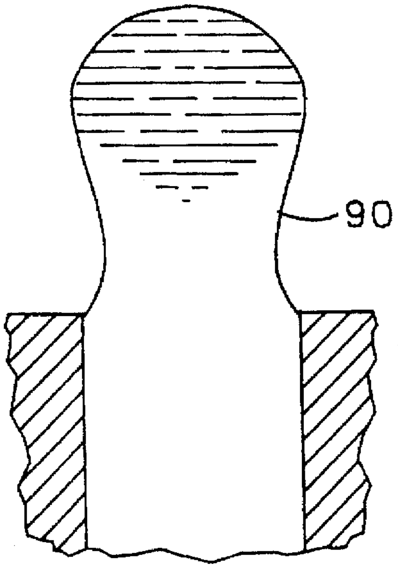
FIGS. 6A and 6B are diagrammatical cross-sectional views showing, at two instants in time, computer simulations of an operational mode zero (large) ink drop being formed in an orifice.
Figure 6B:
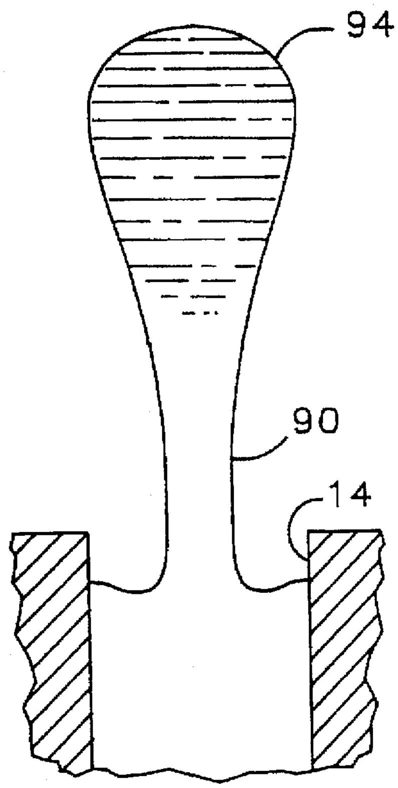
Figure 7A:
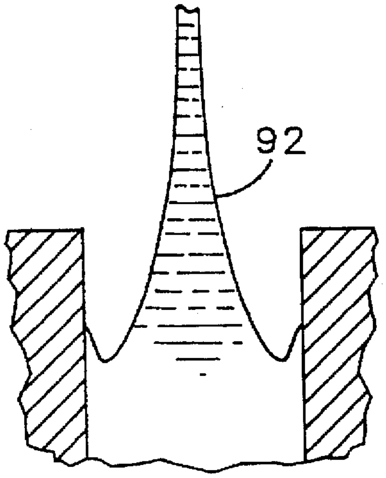
FIGS. 7A and 7B are diagrammatical cross-sectional views showing, at two instants in time, computer simulations of an operational mode two (small) ink drop being formed in an orifice.
Figure 7B:
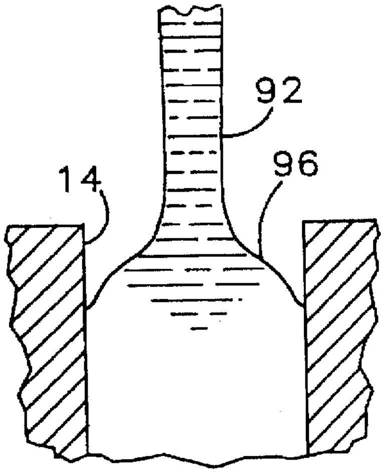

The separate analyses of the internal and surface dynamics identify the orifice flow modes used to provide ink drop volume modulation. FIGS. 6 and 7 are Navier-Stokes simulation plots generated using FLOW3D computational fluid dynamics software manufactured by Flow Science, Inc., of Los Alamos, N.Mex. FIGS. 6 and 7 show orifice flow and drop formation occurring in response to transducer drive waveforms exciting respective modes zero and two. FIG. 6B shows that mode zero excitation generates an ink ejection column 90 having a diameter significantly larger than a mode two ink ejection column 92 shown in FIGS. 7A and 7B. FIG. 6B shows a large ink drop 94 forming that has a diameter about the same as that of orifice 14. FIG. 7B shows a bulging meniscus 96 indicative of residual mode zero energy of an amount insufficient to eject a large drop from orifice 14.

Figure 8A:
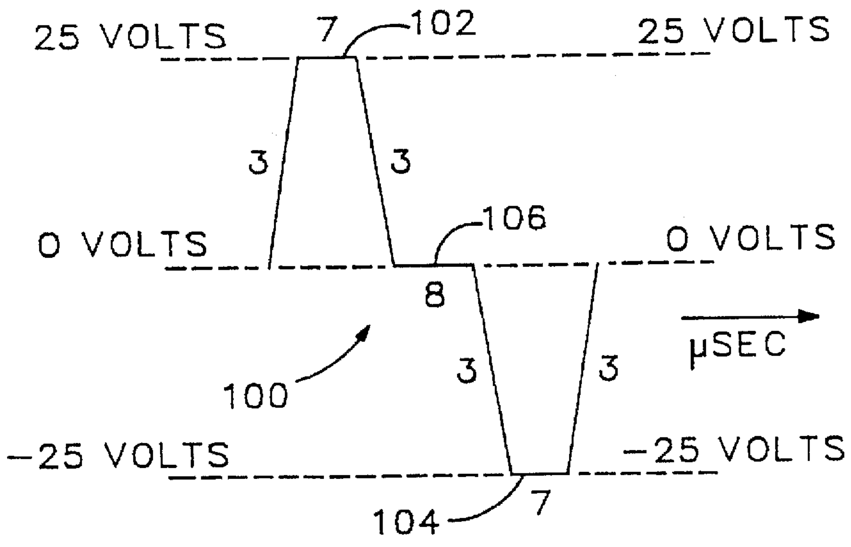
FIGS. 8A, 8B, and 8C are waveform diagrams showing the electrical voltage and timing relationships of PZT drive waveforms used to produce large, medium, and small volume (respective operational modes zero, one, and two) ink drops in a manner according to this invention.
Figure 8B:
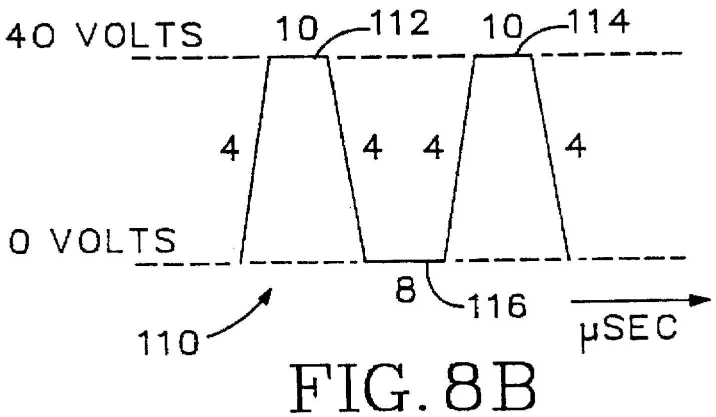
Figure 8C:
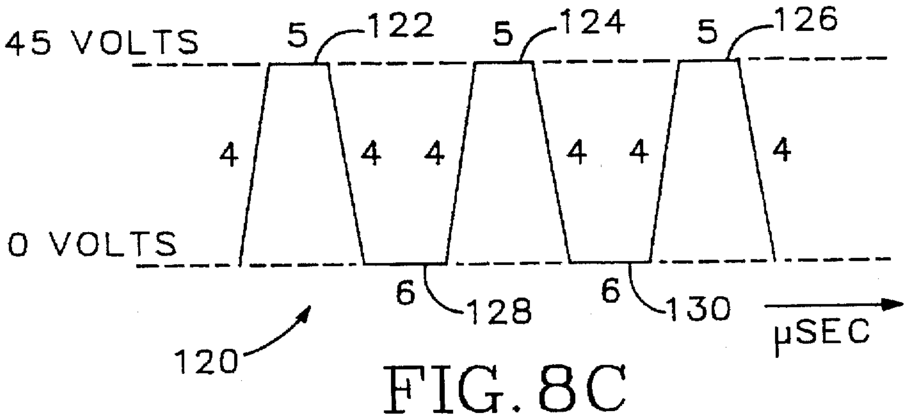

The foregoing theory has been applied in practice to the ink jet of FIG. 1. FIGS. 8A, 8B, and 8C show respective typical electrical waveforms generated by transducer driver 36 (FIG. 1) that concentrate energy in the frequency range of each of the different modes, while suppressing energy in other competing modes.

FIG. 8A shows a bipolar waveform 100 suitable for exciting mode zero. Waveform 100 has a plus 25 volt seven microsecond pulse component 102 and a negative 25 volt seven microsecond pulse component 104 separated by an eight microsecond wait period 106. All rise and fall times of pulse components 102 and 104 are three microseconds. Waveform 100 causes the ejection from orifice 14 of a mode zero generated ink drop.

FIG. 8B shows a double-pulse waveform 110 suitable for exciting mode one. Waveform 110 has a pair of plus 40 volt ten microsecond pulse components 112 and 114 separated by an eight microsecond wait period 116. All rise and fall times of pulse components 112 and 114 are four microseconds. Waveform 110 causes the ejection from orifice 14 of a mode one generated ink drop having one-third the volume of the mode zero ink drop. The mode one ink drop prints on an image receiving medium a dot having a diameter about 60 percent of a mode zero printed dot.

FIG. 8C shows a triple-pulse waveform 120 suitable for exciting mode two. Waveform 120 has three plus 45 volt five microsecond pulse components 122, 124, and 126 separated by six microsecond wait periods 128 and 130. All rise and fall times of pulse components 122, 124, and 126 are four microseconds. Waveform 120 causes the ejection from orifice 14 of a mode two generated ink drop having one-sixth the volume of the mode zero ink drop. The mode two ink drop prints on the image receiving medium a dot having a diameter about 40 percent of the mode zero printed dot.

Figure 9A:
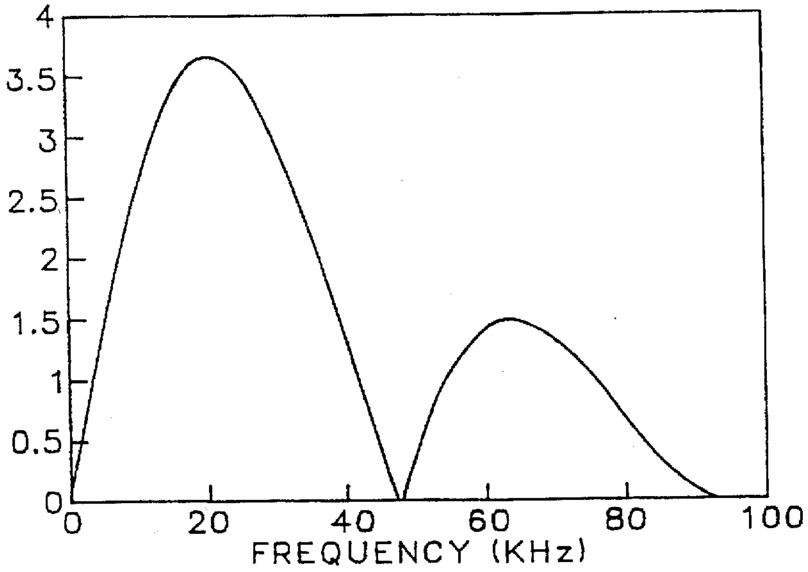
FIGS. 9A, 9B, and 9C graphically show spectral energy as a function of frequency of the PZT drive waveforms shown respectively in FIGS. 8A, 8B, and 8C.
Figure 9B:
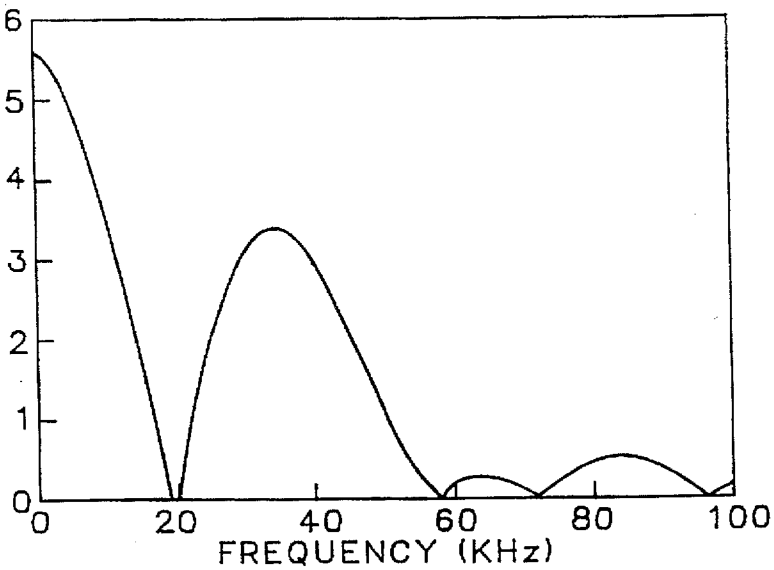
Figure 9C:
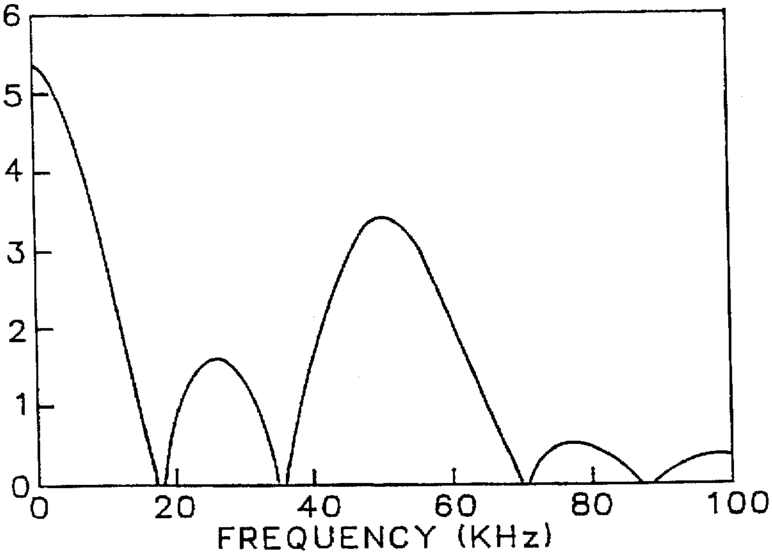

FIGS. 9A, 9B, and 9C show the time-domain spectral energy distribution of respective waveforms 100, 110, and 120. In particular, FIG. 9A shows waveform 100 energy concentrated just above 18 kiloHertz, the frequency required to excite mode zero. FIG. 9B shows waveform 110 energy concentrated near 32 kHz, the frequency required to excite mode one. However, waveform 110 energy is minimized at about 18 kiloHertz to suppress excitation of mode zero. FIG. 9C shows waveform 120 energy concentrated near 50 kiloHertz, the frequency required to excite mode two. However, waveform 120 energy is minimized at about 18 and about 35 kiloHertz to suppress excitation of modes zero and one.

Figure 10:
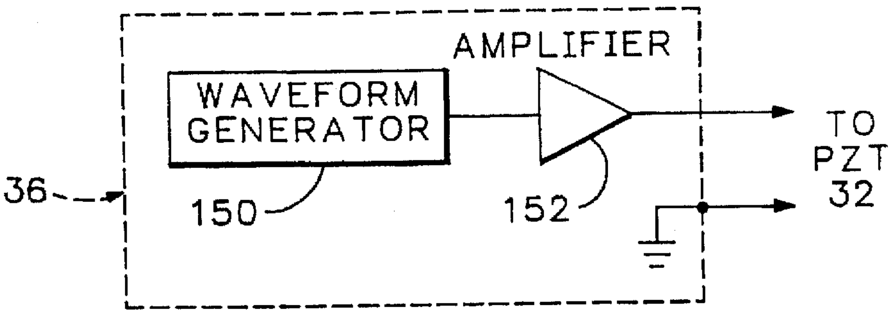
FIG. 10 is a schematic block diagram showing the electrical interconnection of apparatus used to generate the PZT drive waveforms of FIGS. 8A, 8B, and 8C.

FIG. 10 diagrammatically shows apparatus representative of transducer driver 36 (FIG. 1) that is suitable for generating waveforms 100, 110, and 120 of FIG. 8. Any suitable commercial waveform generator can be employed. A waveform generator 150 is electrically connected to a voltage amplifier 152 that provides an output signal suitable for driving metal film layers 34 of transducer 32.

Figures 11A, 11B, 11C:
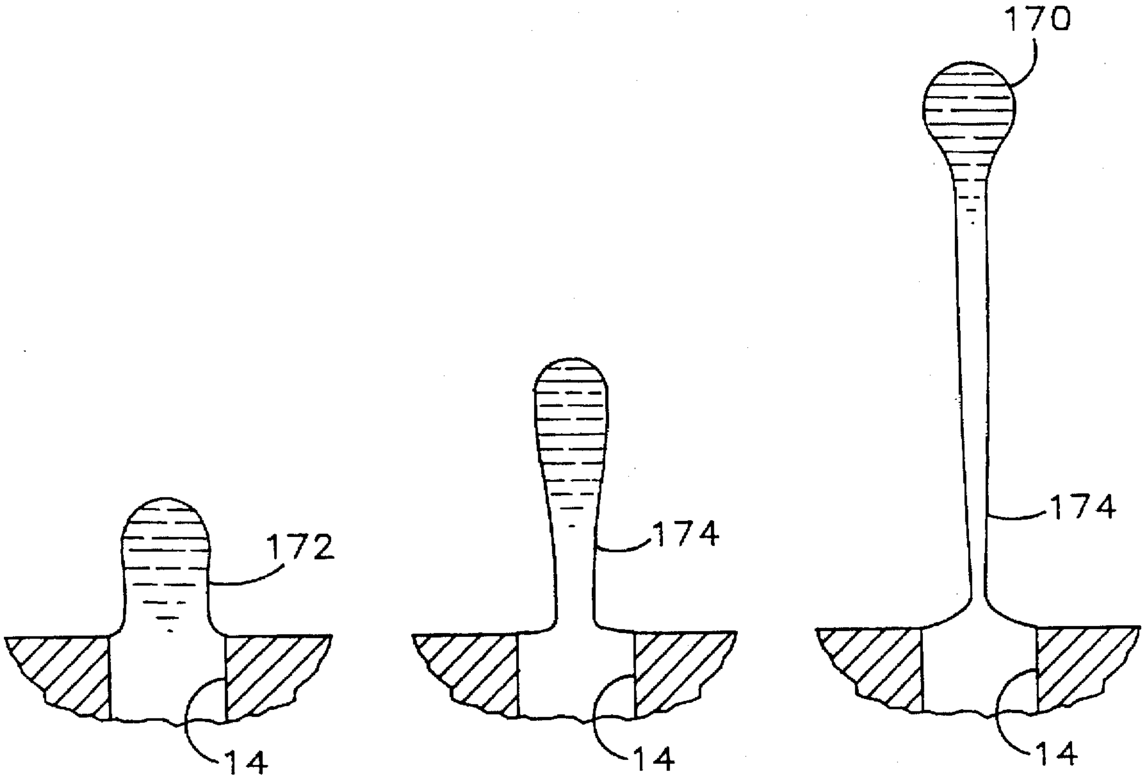
FIGS. 11A, 11B, and 11C are enlarged diagrammatical cross-sectional views taken respectively at three instants in time of a large volume ink drop being ejected from an orifice in a manner according to this invention.

FIGS. 11A, 11B, and 11C show a time progression of the development of a mode zero ink drop 170 from orifice 14 of ink jet 10 obtained by photographing a video stillframe image of an actual drop. FIG. 11A shows a mode zero bulk flow 172 having a diameter defined by orifice 14, emerging from orifice 14 to begin generating drop 170. FIG. 11B shows the bulk flow retracting into orifice 14 as a tail 174 develops. FIG. 11C shows large drop 170 of nearly developed and tail 174 starting to break off from orifice 14. The actual mode zero drop development compares closely with the simulated mode zero drop development shown in FIGS. 6A. and 6B.

Figure 12A:
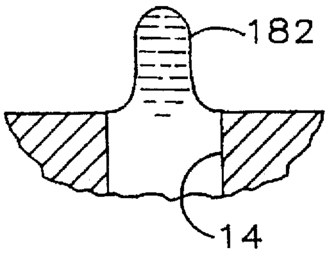
FIGS. 12A, 12B, and 12C are enlarged diagrammatical cross-sectional views taken respectively at three instants in time of a medium volume ink drop being ejected from an orifice in a manner according to this invention.
Figure 12B:
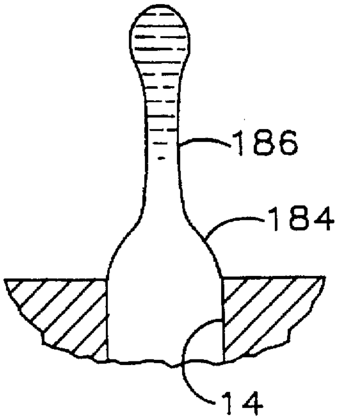
Figure 12C:
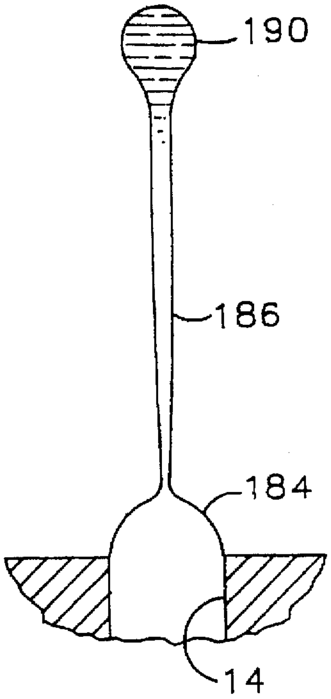

FIGS. 12A, 12B, and 12C show a time progression of the development of a mode one ink drop 180 from orifice 14 of ink jet 10 obtained by photographing a video stillframe image of an actual drop. FIG. 12A shows a mode one flow 182 having a diameter smaller than orifice 14, emerging from orifice 14 to begin generating drop 180 of FIG. 12C. FIG. 12B shows an orifice diameter bulge 184 emerge from orifice 14 as a tail 186 develops. Bulge 184 indicates the presence of residual zero mode energy. FIG. 12C shows mode one drop 180 nearly developed and tail 186 starting to break off from bulge 184. As described with reference to FIG. 7, there is insufficient energy for bulge 184 to form a large drop.

Figure 13A:
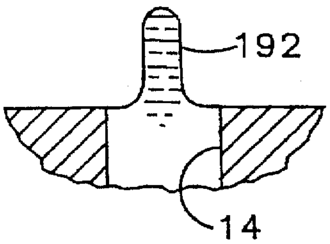
FIGS. 13A, 13B, and 13C are enlarged diagrammatical cross-sectional views taken respectively at three instants in time of a small volume ink drop being ejected from an orifice in a manner according to this invention.
Figure 13B:
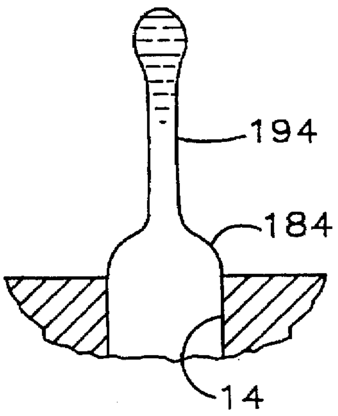
Figure 13C:
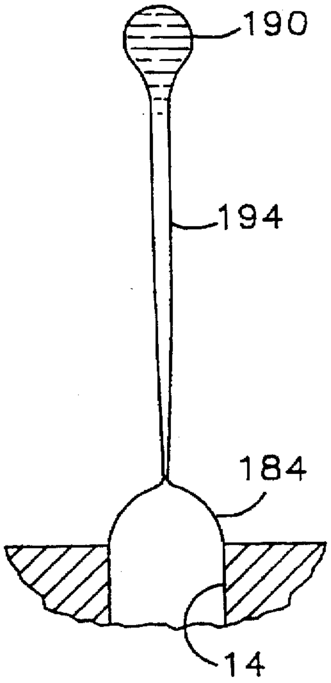

FIGS. 13A, 13B, and 13C show a time progression of the development of a mode two ink drop 190 of FIG. 13C from orifice 14 of ink jet 10 obtained by photographing a video stillframe image of an actual drop. FIG. 13A shows a mode two flow 192 having a diameter smaller than orifice 14, emerging from orifice 14 to begin generating drop 190.

Mode two flow 192 has a smaller diameter than mode one flow 182, which indicates the presence of higher order mode excitation energy. FIG. 13B shows the orifice diameter bulge 184 again emerging from orifice 14 as a tail 194 develops. Again, the presence of bulge 184 indicates the presence of residual zero mode energy. FIG. 13C shows mode two drop 190 nearly developed and tail 194 starting to break off from bulge 184. In a manner similar to mode one drop formation, there is insufficient energy for bulge 184 to form a large drop. The actual mode two drop development compares closely with the simulated mode two drop development shown in FIGS. 7A and 7B.

Table 2 shows experimental data comparing the drop volume, printed dot size, transit time (time to an image receiving medium spaced about 0.81 millimeter from orifice 14), and drop ejection velocity.

TABLE 2

| | Mode 0 Drops | Mode 1 Drops | Mode 2 Drops | Units |
|---|---|---|---|---|
| Drop volume | 126.2 | 46.4 | 23.8 | picoliters |
| Dot diameter | 130 | 84 | 64 | microns |
| Transit time | 213 | 219 | 219 | microsec |
| Drop velocity | 3.8 | 3.7 | 3.7 | meters/sec |

The transit time for the different drop sizes is substantially the same, demonstrating the ability to produce drops of different sizes having sufficient initial kinetic energy to produce equivalent velocities. The drop velocities are sufficient to ensure drop landing accuracy and high-quality dot formation.

An unexpected result observed while gathering experimental data was the relative independence of drop volume and drop ejection velocity. Changing the amplitude of drive waveforms 100, 110, and 120 around their preferred amplitudes changed the drop ejection velocity without changing the drop volume. This result provides a degree of adjustment useful for matching the ejection velocities of the different drop volumes. It also demonstrates the dominant role of mode shape in determining drop volume.

The data shown in Table 2 were gathered using the ink jet 10 of FIG. 1 driven at a drop repetition rate of two kiloHertz (2000 drops per second). Ink jet 10 is a single representative jet, such as one employed in an color ink jet array print head. Ink jet 10 has the dimensions shown in Table 1 but is merely representative of a typical PZT driven ink jet print head suitable for use with the invention.

Figure 14:
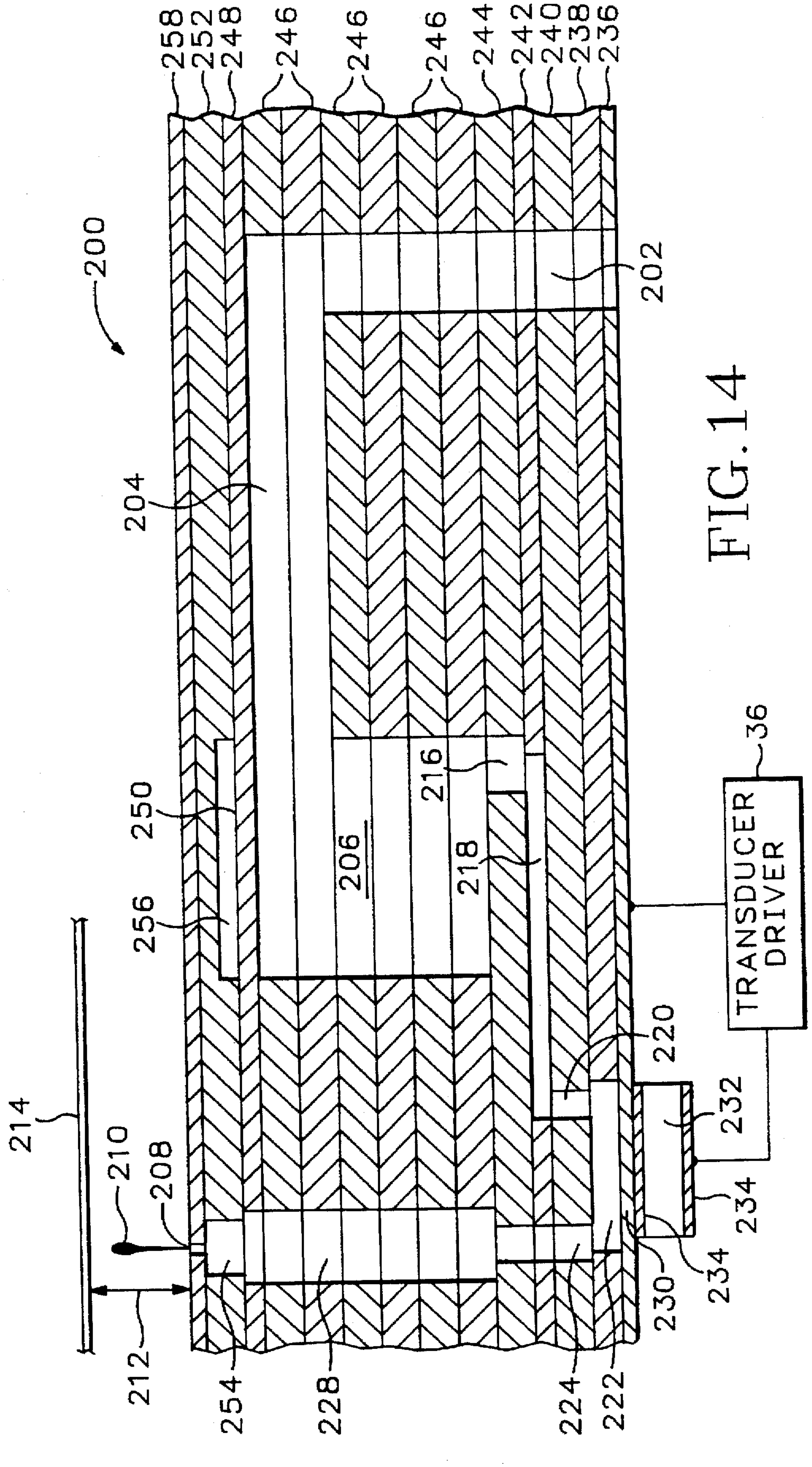
FIG. 14 is an enlarged diagrammatical cross-sectional view of a preferred PZT driven ink jet suitable for use in an ink jet array print head of this invention.

A drop repetition rate exceeding fifteen kiloHertz (15000 drops per second) is possible by using a preferred ink jet design shown in FIG. 14, which is optimized to eliminate internal resonant frequencies that are close to frequencies required to excite orifice resonance modes needed for drop volume modulation.

FIG. 14 shows a cross-sectional view of a preferred ink jet 200 which is part of an ink jet print head suitable for use with this invention. Ink jet 200 has a body that defines an ink inlet port 202, an ink feed channel 204, and an ink manifold 206 through which ink is delivered to ink jet 200. The body also defines an ink drop forming orifice 208 from which a gray scale modulated ink drop 210 is ejected across a distance 212 toward an image receiving medium 214. In general, a preferred ink jet print head includes an array of ink jets 200 that are closely spaced apart from one another for use in ejecting patterns of gray scale modulated ink drops 210 toward image receiving medium 214. The print head also has at least four of manifolds 206 for receiving, black, cyan, magenta, and yellow ink for use in black plus subtractive three-color printing.

Ink flows from manifold 206 through an inlet port 216, an inlet channel 218, and a pressure chamber port 220 into an ink pressure chamber 222. Ink leaves pressure chamber 222 by way of an outlet port 224 and flows through a cross-sectionally oval outlet channel 228 to orifice 208, from which ink drops 210 are ejected.

Ink pressure chamber 222 is bounded on one side by a flexible diaphragm 230. A PZT transducer 232 is secured to diaphragm 230 by an appropriate adhesive and overlays ink pressure chamber 222. As with ink jet 10, transducer 232 has metal film layers 234 to which electronic transducer driver 36 is electrically connected. PZT transducer 232 is preferably operated in its bending mode.

To facilitate manufacture of the preferred ink jet print head, ink jet 200 is formed of multiple laminated plates or sheets, such as of stainless steel, that are stacked in a superimposed relationship. All the plates are 0.2-millimeter thick unless otherwise specified.

In the illustrated FIG. 14 embodiment of the present invention, the plates include a 0.076-millimeter thick diaphragm plate 236 that forms diaphragm 230 and a portion of ink inlet port 202; a body plate 238 that forms pressure chamber 222, a portion of ink inlet port 202, and provides a rigid backing for diaphragm plate 236; a separator plate 240 that forms pressure chamber port 220, and portions of ink inlet port 202 and outlet port 224; a 0.1-millimeter thick inlet channel plate 242 that forms inlet channel 218, and portions of ink inlet port 202 and outlet port 224; a separator plate 244 that forms inlet port 216 and portions of ink inlet port 202 and outlet port 224; six manifold plates 246 that form ink manifold 206, ink feed channel 204, a majority of outlet channel 228, and the remaining portion of ink inlet port 202; a 0.05-millimeter thick wall plate 248 that forms a compliant wall 250 for ink manifold 206, and a minor portion of outlet channel 228, a orifice brace plate 252 that forms a transition region 254 between outlet channel 228 and orifice 208, and an air chamber 256 behind compliant wall 250, and a 0.064-millimeter thick orifice plate 258 that forms orifice 208.

Table 3 shows preferred dimensions for the internal features of ink jet 200 that together provide ink jet 200 with a Helmholtz resonant frequency of about 24 kiloHertz.

TABLE 3

| | All dimensions in millimeters | | | |
|---|---|---|---|---|
| Feature | Length | Width | Height | Cross-section |
| Ink manifold | 3.04 | 1.22 | 1.22 | Rectangular |
| Compliant wall | 3.04 | 1.22 | 0.05 | Rectangular |
| Inlet channel | 5.08 | 0.50 | 0.10 | Rectangular |
| Pressure chamber | — | 2.13 | 0.20 | Circular |
| Outlet port | 0.50 | 0.41 | — | Circular |
| Outlet channel | 1.27 | 0.89 | 0.50 | Oval |
| Transition region | 0.20 | 0.89 | 0.41 | Oval |
| Orifice | 0.06 | 0.06 | — | Circular |

Figure 15A:
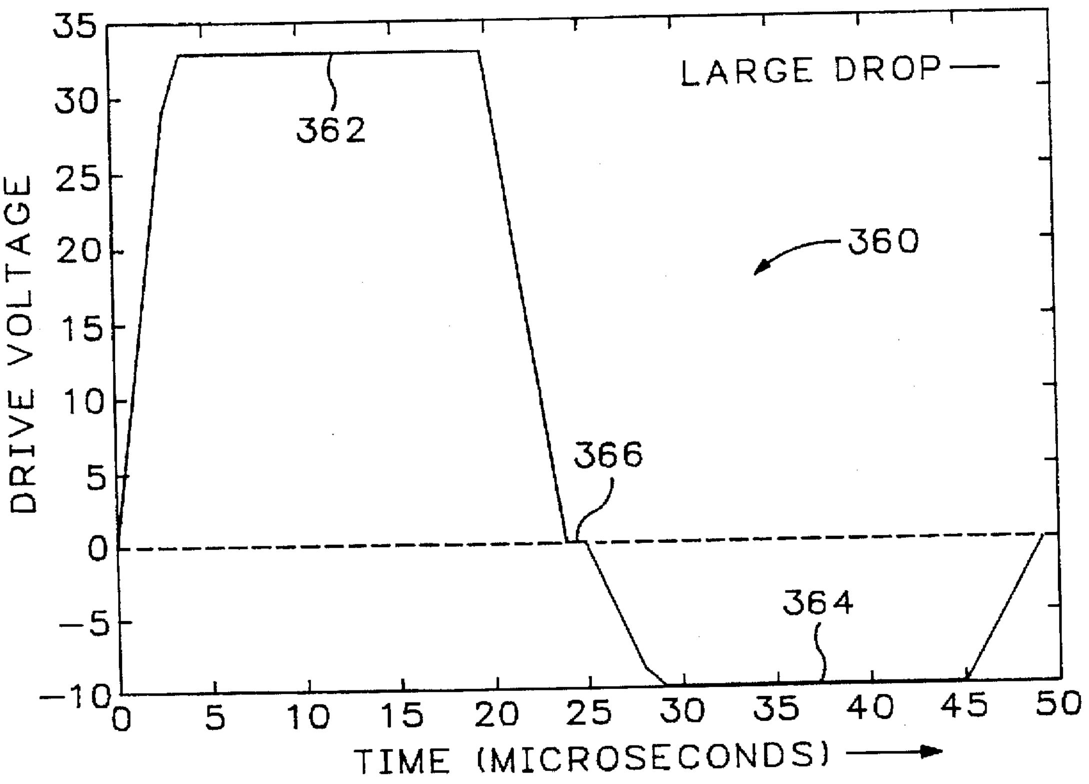
FIGS. 15A and 15B are waveform diagrams showing the electrical voltage and timing relationships of PZT drive waveforms used to produce two ink drop volumes (respective operational modes zero and one) in a preferred embodiment of this invention.
Figure 15B:
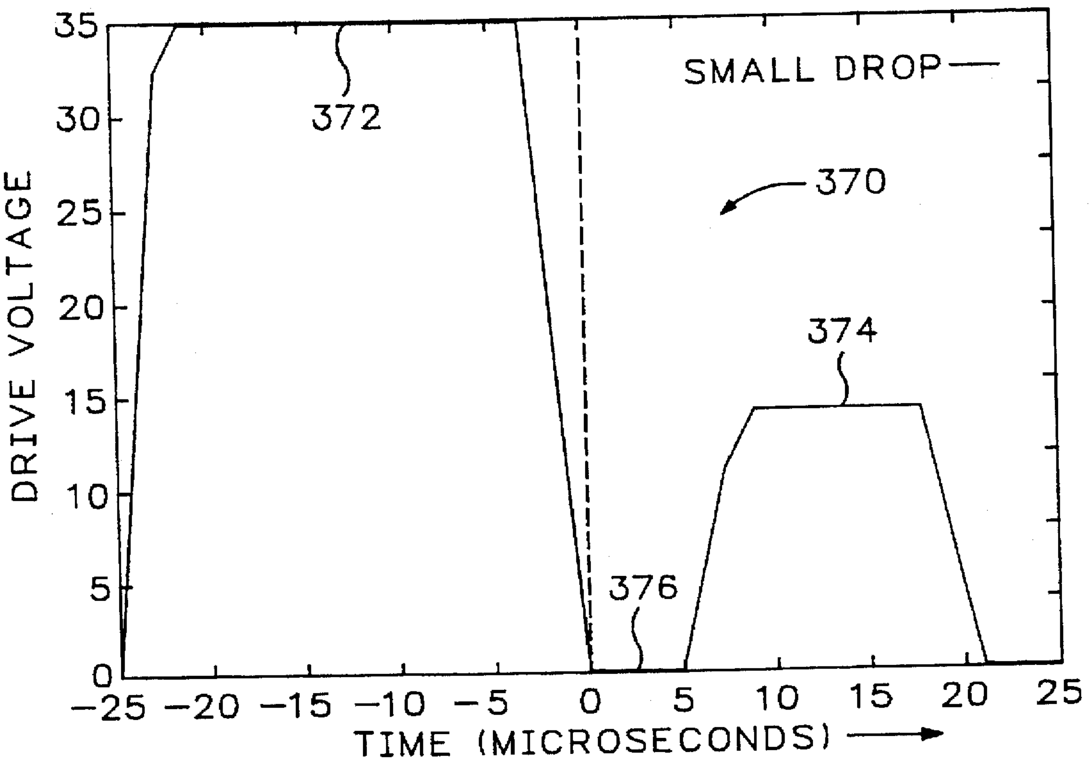

With continued reference to FIG. 14, FIGS. 15A and 15B show respective preferred electrical waveforms generated by transducer driver 36 that concentrate energy in the frequency range of each of the modes zero and one, while suppressing energy in other competing modes.

FIG. 15A shows a bipolar waveform 360 suitable for exciting mode zero. Waveform 360 has a plus 33-volt, 16-microsecond pulse component 362 and a negative 10-volt, 16-microsecond pulse component 364 separated by a 1-microsecond wait period 366. The rise and fall times of pulse components 362 and 364 are all about 3 to 4 microseconds. Waveform 360 causes the ejection from orifice 208 of about a 105-nanogram, mode zero generated ink drop.

FIG. 15B shows a double-pulse waveform 370 suitable for exciting mode one. Waveform 370 has a plus 35-volt, 18-microsecond pulse component 372 and a plus 14-volt, 9-microsecond pulse component 374 separated by a 5-microsecond wait period 376. The rise and fall times of pulse components 372 and 374 are all about 3 to 4 microseconds. Waveform 370 causes the ejection from orifice 208 of about a 65-nanogram, mode one generated ink drop. The mode one ink drop prints on an image receiving medium a dot having a diameter about 60 percent of a mode zero printed dot.

Figure 16A:
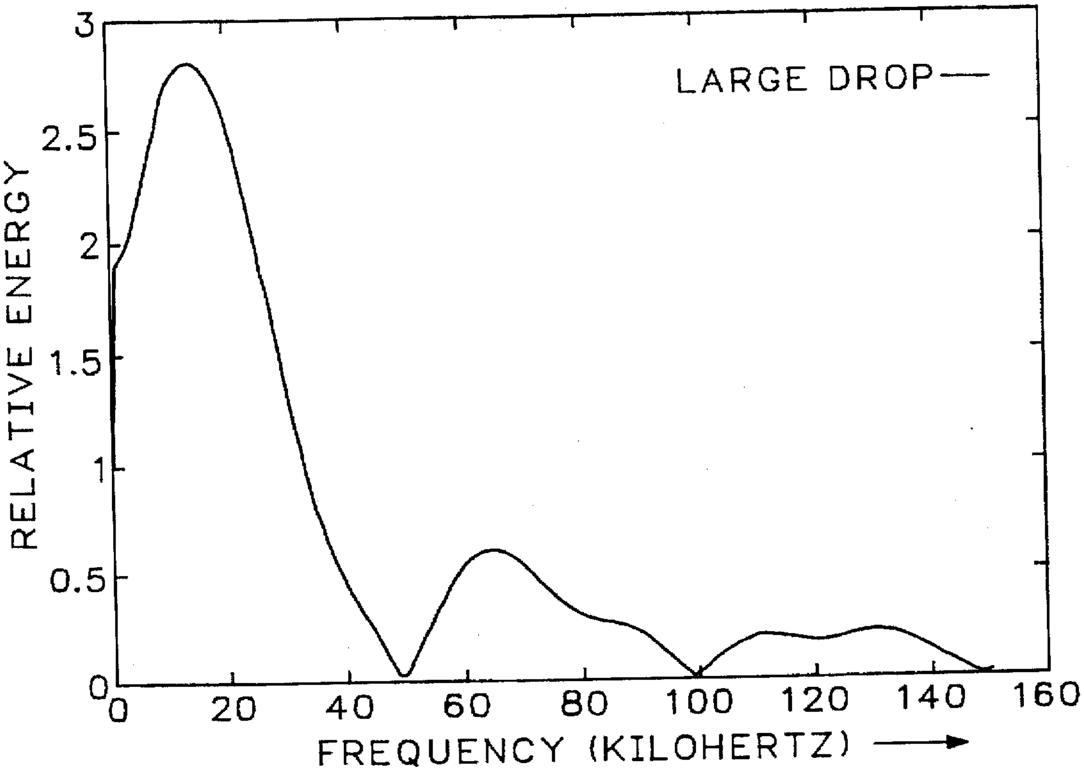
FIGS. 16A and 16B graphically show spectral energy as a function of frequency of the PZT drive waveforms shown respectively in FIGS. 15A and 15B.
Figure 16B:
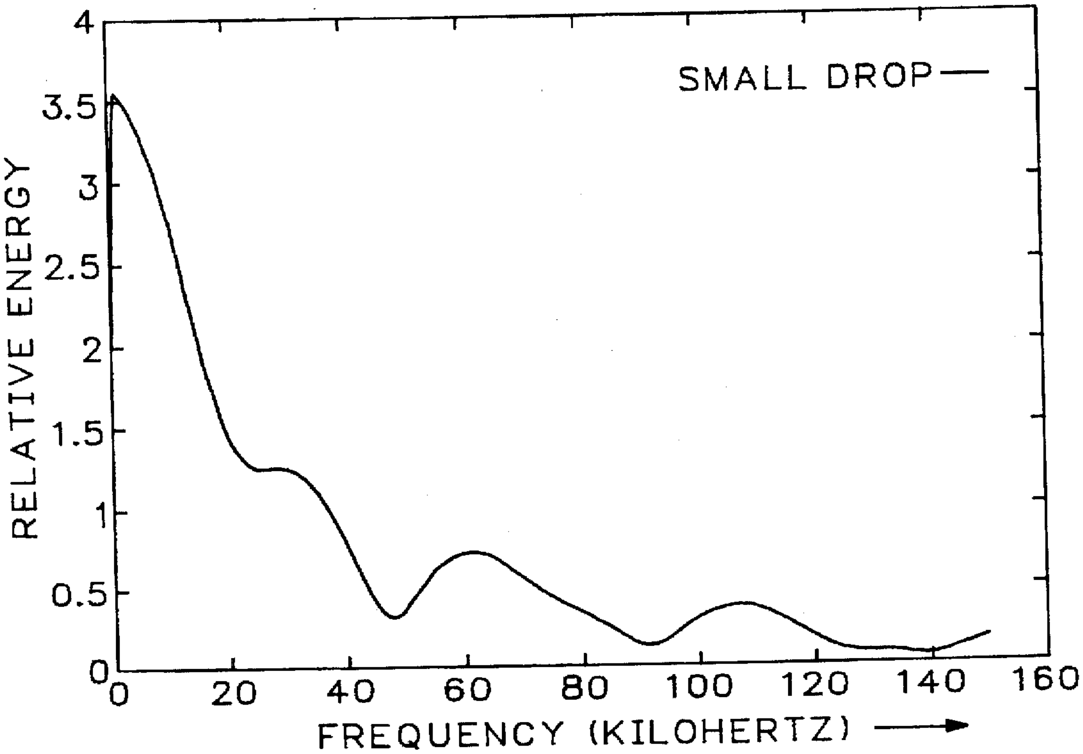

FIGS. 16A and 16B show the time-domain spectral energy distribution of respective waveforms 360 and 370. In particular, FIG. 16A shows waveform 360 energy concentrated just below 20 kiloHertz, the frequency required to excite mode zero. In contrast, FIG. 16B shows waveform 370 energy concentrated near 30 kiloHertz, the frequency required to excite mode one, and minimized at about 20 kiloHertz to suppress the excitation of mode zero.

Figure 17:
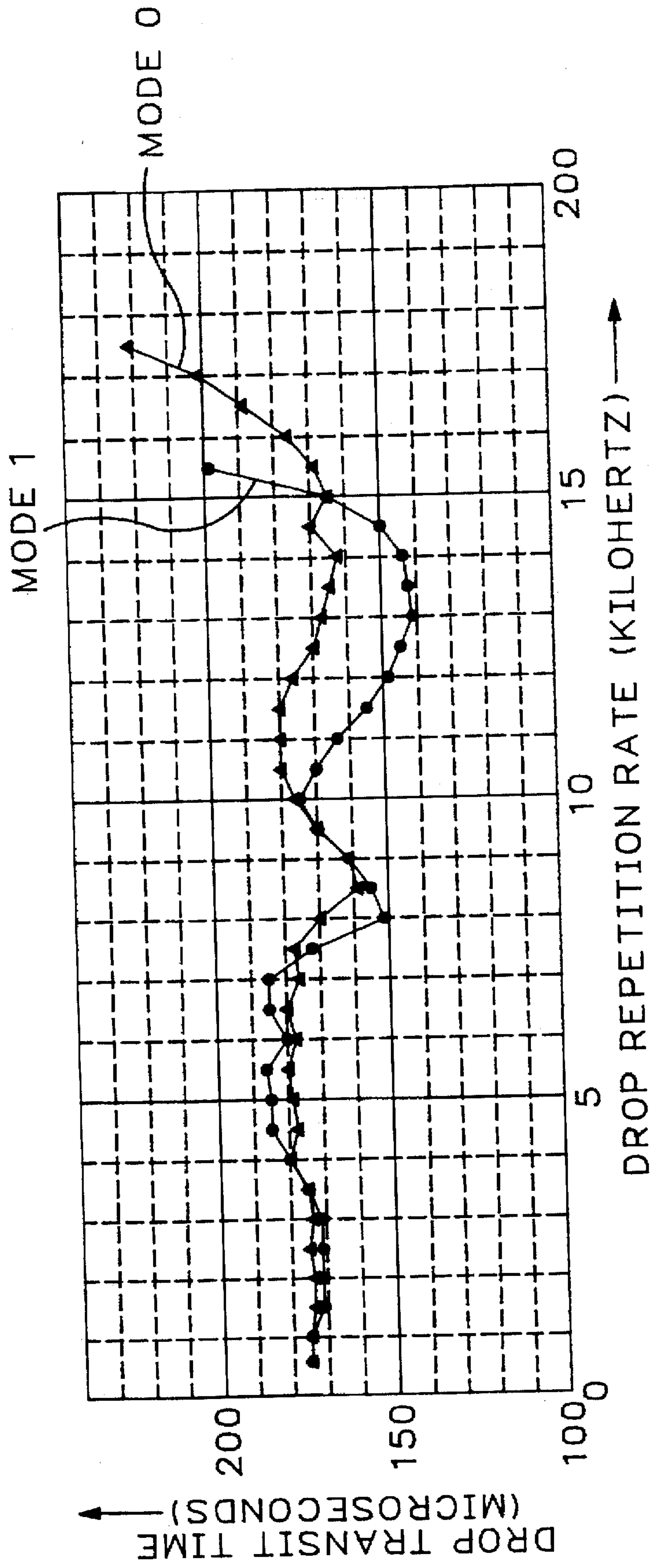
FIG. 17 graphically shows the transit time required for ink drops to travel from an orifice to an image receiving medium when the ink jet of FIG. 14 is actuated by the waveforms of FIGS. 15A and 15B over a wide range of drop ejection rates.

FIG. 17 shows the transit times of mode zero (105 nanogram) and mode one (65 nanogram) ink drops ejected from orifice 208 to image receiving medium 214 when PZT transducer 232 of ink jet 200 is repetitively driven over a wide repetition rate range by waveforms 360 and 370. The transit times are sufficiently matched over the repetition rate range from about zero kiloHertz to above about 18 kiloHertz to provide a drop landing accuracy capable of supporting high-quality gray scale printing or, alternatively, selectable resolution printing.

Selectable resolution printing is an operational mode of this invention in which, rather than printing image receiving medium 214 with gray scale modulated ink drops, a single drop size is selected and a scanning speed of ink jet 200 relative to image receiving medium 214 is changed such that the dot-to-dot spacing of printed dots is correspondingly changed to adapt to the changed drop size.

In a preferred switchable resolution embodiment, ink jet 200 ejects mode zero (105 nanogram) drops while moving at a first scanning speed such that 12 dot per millimeter (300 dots per inch) standard-resolution printed images are formed, and ejects mode one (65 nanogram) drops while moving at a second scanning speed such that 24 dot per millimeter (600 dots per inch) high-resolution printed images are formed. Of course, ink jet 200 may eject even smaller, higher mode ink drops and be adapted to provide yet another printing resolution.

Other alternative embodiments of portions of this invention include, for example, its applicability to jetting various fluid types including, but not limited to, aqueous and phase-change inks of various colors.

Likewise, skilled workers will recognize that the invention is useful for exciting modes higher than modes one, two, and three described herein and is not limited to exciting those modes in a cylindrical orifice.

Skilled workers will realize that waveforms other than waveforms 100, 110, 120, 360, and 370 can achieve the desired results and that a spectrum analyzer may be used to view a resulting energy spectrum while shaping a waveform intended to excite a particular orifice resonance mode in a desired orifice geometry, fluid type, and transducer type.

It should be noted that this invention is useful in combination with various prior art techniques including dithering and electric field drop acceleration to provide enhanced image quality and drop landing accuracy.

In summary, the invention is amenable to any fluid jetting drive mechanism and architecture capable of providing the required drive waveform energy distribution to a suitable orifice and its fluid meniscus surface.

It will be obvious to those having skill in the art that many changes may be made to the details of the above-described embodiments of this invention without departing from the underlying principles thereof. For example, electromechanical transducers other than the PZT bending-mode type described may be used. Shear-mode, annular constrictive, electrostrictive, electromagnetic, and magnetostrictive transducers are suitable alternatives. Similarly, although described in terms of electrical energy waveforms to drive the transducers, any other suitable energy form could be used to actuate the transducer, such as, but not limited to, acoustical or microwave energy. Where electrical waveforms are employed, the waveforms can equally well be established by unipolar or bipolar pairs or groups of pulses. Accordingly, it will be appreciated that this invention is, therefore, applicable to fluid drop size modulation applications other than those found in ink jet printers. The scope of the present invention should be determined, therefore, only by the following claims.

We claim:

1. In an ink jet printing apparatus, having a transducer and a transducer driver, said transducer coupled to a pressure chamber that is fluidicallly coupled to an orifice in which an ink forms a meniscus and the orifice and an image receiving medium move at selectable scanning speeds relative to one another, and the orifice deposits at a first resolution on the image receiving medium ink dots of a first diameter by moving the orifice and the image receiving medium at a first scanning speed relative to one another and ejecting from the orifice ink drops each having a first volume, an improvement comprising:

the transducer driver generating at least a first and a second selectable energy input that actuates a transducer coupled to the pressure chamber to excite in the meniscus at least respective first and second mode shapes, the at least first and second selectable energy inputs causing ejection of ink drops having respectively at least the first volume and a second volume, the first energy input generated in association with the first scanning speed further having at least a first spectral energy distribution that excites the meniscus in a first mode shape to eject from the orifice ink drops having the first volume; and the transducer driver further selecting the second energy input in association with a second scanning speed, the second energy input having at least a second spectral energy distribution that excites the meniscus in a second mode shape to eject from the orifice ink drops having at least a second volume less than the first volume, the second energy input and the second scanning speed cooperating to deposit ink dots of the second diameter on the image receiving medium at a second resolution.

2. The apparatus of claim 1 in which the first mode shape is a mode zero mode shape.

3. The apparatus of claim 1 in which the second mode shape is one of a mode one, a mode two, and a mode three mode shape.

4. The apparatus of claim 1 in which the first resolution deposits dots on the image receiving medium at about a 12 dot per millimeter resolution.

5. The apparatus of claim 1 in which the second resolution deposits dots on the image receiving medium at about a 24 dot per millimeter resolution.

6. The apparatus of claim 1 in which the first energy input is a first electrical waveform and the second energy input is a second electrical waveform.

7. The apparatus of claim 6 in which the second mode shape is a mode one, two, or three mode shape and the second electrical waveform includes one of a unipolar group of pulses and a bipolar group of pulses.

8. The apparatus of claim 6 in which the first mode shape is a mode zero mode shape and the first electrical waveform includes one of a unipolar pair of pulses spaced apart by a wait period and a bipolar pair of pulses spaced apart by a second wait period.

9. The apparatus of claim 1 in which the transducer driver repetitively generates the selected one of the first and second energy inputs at a rate such that the selected first and second ink drop volumes are ejected from the orifice at a drop ejection rate having a range of zero to at least about 20,000 ink drops per second.

10. The apparatus of claim 9 in which the first and second energy inputs each have an amplitude adjustable by the transducer driver that causes the selected first and second ink drop volumes to have substantially equal drop transit times plus or minus about 6 microseconds from the orifice to the image receiving medium over a drop ejection rate range of zero to at least about 18,000 ink drops per second.

11. The apparatus of claim 1 in which the first and second energy inputs each have spectral energy distributions that are concentrated around a desired orifice resonant frequency and suppressed at an undesired orifice resonant frequency.

12. The apparatus of claim 1 in which the transducer is of a piezoelectric type.

13. The apparatus of claim 1 further including an ink manifold and in which the ink manifold, the pressure chamber, and the ink jet orifice are fluidically coupled by channels that are sized to avoid a parasitic resonance at an orifice mode shape exciting frequency.

14. In a printer having an ink jet orifice and an image receiving medium that move relative to one another and the orifice deposits ink dots on the image receiving medium at a predetermined resolution, a selectable resolution printing method comprising the steps of:

providing a pressure chamber fluidically coupled to the orifice in which an ink forms a meniscus;

generating via a transducer driver selectable energy inputs, a selected one of the selectable energy inputs which actuates a transducer coupled to the pressure chamber to excite in the meniscus a respective mode shape that causes ejection of an ink drop having an associated volume;

moving the orifice and the image receiving medium relative to one another at a first scanning speed;

selecting a first energy input having a first spectral energy distribution that excites the meniscus in a first mode shape to eject from the orifice ink drops having a first volume;

ejecting the ink drops of the first volume toward the image receiving medium to deposit ink dots thereon at a first resolution;

moving the orifice and the image receiving medium relative to one another at a second scanning speed;

selecting a second energy input having a second spectral energy distribution that excites the meniscus in a second mode shape to eject from the orifice ink drops having a second volume;

ejecting the ink drops of the second volume toward the image receiving medium to deposit ink dots thereon at a second resolution.

15. The method of claim 14 in which the first mode shape is a mode zero mode shape.

16. The method of claim 14 in which the second mode shape is one of a mode one, a mode two, and a mode three mode shape.

17. The method of claim 14 in which the step of ejecting the ink drops of the first volume further includes the step of depositing dots at the first resolution on the image receiving medium at about a 12 dot per millimeter resolution.

18. The method of claim 14 in which the step of ejecting the ink drops of the second volume further includes the step of depositing dots at the second resolution on the image receiving medium at about a 24 dot per millimeter resolution.

19. The method of claim 14 in which the first energy input is a first electrical waveform and the second energy input is a second electrical waveform.

20. The method of claim 19 in which the second mode shape is a mode one, two, or three mode shape and the generating step further entails generating a second electrical waveform that includes one of a unipolar group of pulses and a bipolar group of pulses.

21. The method of claim 19 in which the first mode shape is a mode zero mode shape and the generating step further entails generating a first electrical waveform that includes one of a unipolar pair of pulses spaced apart by a wait period and a bipolar pair of pulses spaced apart by a wait period.

22. The method of claim 14 in which the generating step further entails repetitively generating a selected one of the first and second energy inputs at a rate such that the selected first and second ink drop volumes are ejected from the orifice at a drop ejection rate having a range of zero to at least about 20,000 ink drops per second.

23. The method of claim 22 in which the generating step further includes adjusting an amplitude of the first and second energy inputs to cause the selected first and second ink drop volumes to have a substantially equal drop transit time plus or minus about 6 microseconds from the orifice to the image receiving medium over a drop ejection rate range of zero to at least about 18,000 ink drops per second.

24. The method of claim 14 in which the generating step further includes the step of concentrating a spectral energy distribution of each of the first and second energy inputs around a desired orifice resonant frequency and suppressing the spectral energy distribution of each of the first and second energy inputs around an undesired orifice resonant frequency.

25. The method of claim 14 in which the providing step further includes the step of providing an ink manifold, coupling fluidically the ink manifold, the pressure chamber, and the ink jet orifice with channels, and sizing the channels to avoid a parasitic resonance at an orifice mode shape exciting frequency.

* * * * *

UNITED STATES PATENT AND TRADEMARK OFFICE
CERTIFICATE OF CORRECTION

PATENT NO : 5,689,291
DATED : November 18, 1997
INVENTOR(S) : David A. Tence, Sharon S. Berger and Ronald F. Burr It is certified that error appears in the above-identified patent and that said Letters Patent are hereby corrected as shown below:

Column 14, line 33, after "actuate" delete "a" and insert --the--;

Column 16, line 26, after "entails" insert --the step of--;

Column 16, line 31, after "entails" insert --the step of--;

Column 16, line 34, after "entails" insert --the step of--;

Signed and Sealed this

Tenth Day of March, 1998

Attest:

BRUCE LEHMAN

*Attesting Officer* *Commissioner of Patents and Trademarks*